No. 699,937. Patented May 13, 1902.
A. D. THOMAS.
COTTON PRESS.
(Application filed Feb. 25, 1902.)
(No Model.) 2 Sheets—Sheet 1.
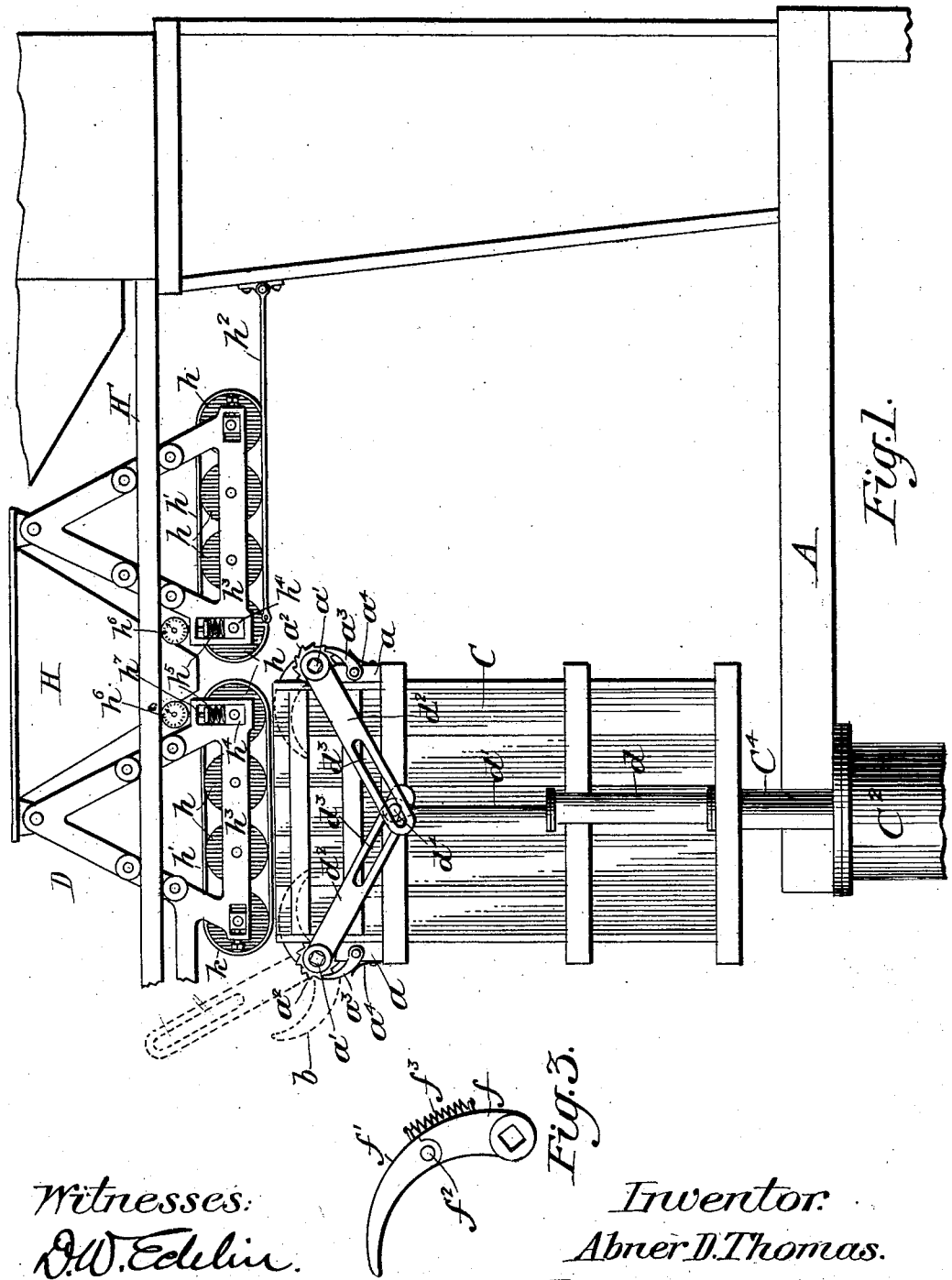
Witnesses:
D. W. Edelin.
A. Harrycutter
Inventor:
Abner D. Thomas.
By Robt. P. Harris,
Atty.

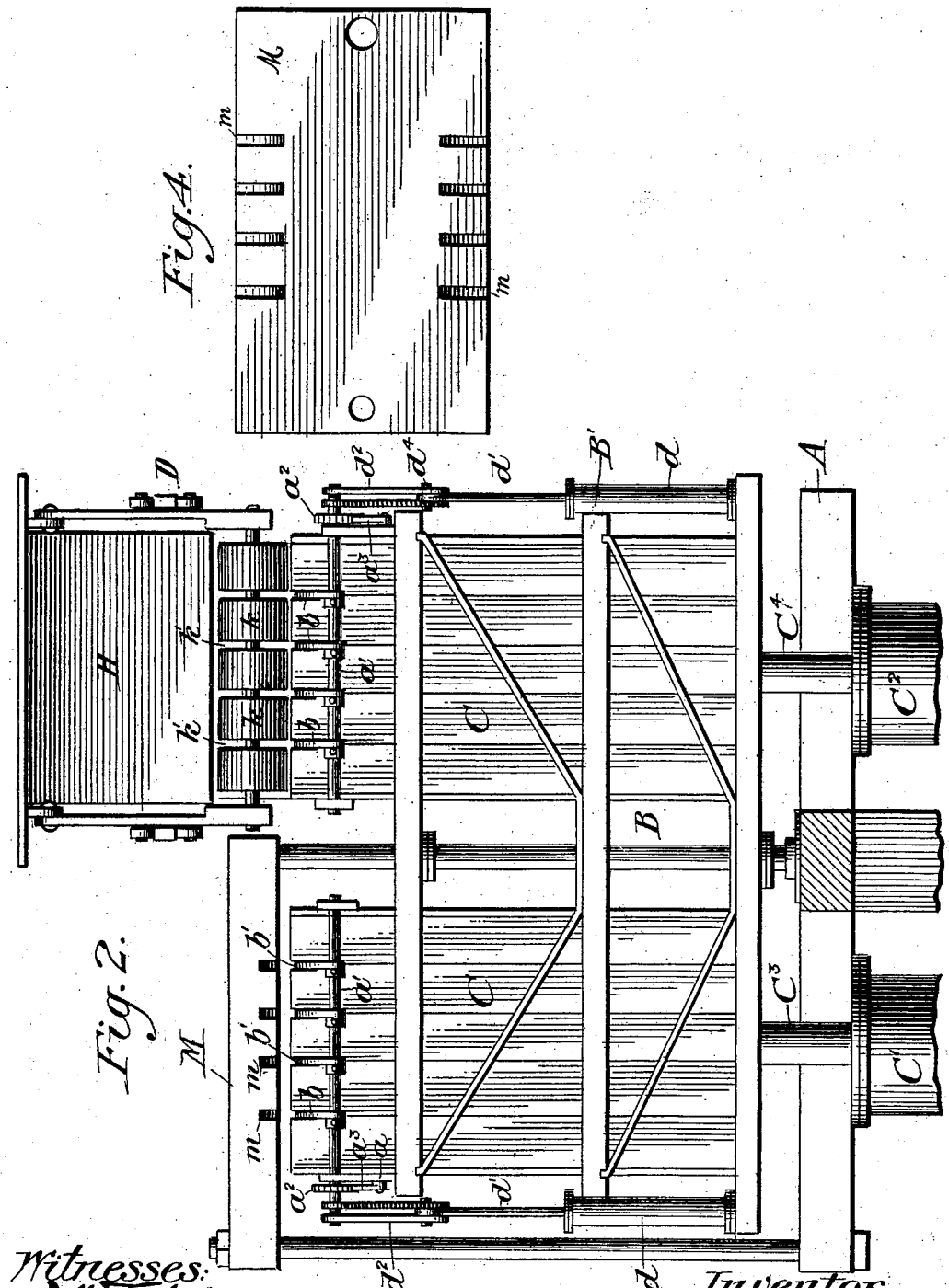

UNITED STATES PATENT OFFICE.

ABNER D. THOMAS, OF LITTLE ROCK, ARKANSAS, ASSIGNOR TO THOMAS GIN-COMPRESS COMPANY, A CORPORATION OF ARKANSAS.

COTTON-PRESS.

SPECIFICATION forming part of Letters Patent No. 699,937, dated May 13, 1902.

Application filed February 25, 1902. Serial No. 95,614. (No model.)

*To all whom it may concern:*

Be it known that I, ABNER D. THOMAS, a citizen of the United States, residing at Little Rock, in the county of Pulaski and State of Arkansas, have invented certain new and useful Improvements in Cotton-Presses, of which the following is a specification, reference being had to the accompanying drawings, forming a part thereof.

The invention to be hereinafter described relates to cotton-presses, and more particularly to that type of such presses wherein the cotton is assembled in layers in a baling-box or chamber under any desired degree of compression and thereafter transferred to the finishing side of the press for any desired pressure or, it may be, final compression into a compact bale for shipment. It is the usual practice at the present time to bale the cotton at the gin-house in large but loosely-packed bales, which are transferred to distant points and compressed to the size and density desired by heavy and powerful presses; but this method of baling necessitates repeated handling of the cotton, first, in the production of the loose bale at the gin and, second, in the shipment to the central or distant point for compression. To obviate these obvious objections, attempts have been made to provide a baling-press that could assemble the cotton in layers under more or less compression as it came from the gin and upon the completion of the bale to transfer it with little handling as possible to the finishing side of the press, where the bale was subjected to the final compression desired. It is obvious in such form of presses that upon completion of the preliminary bale on the bale-forming portion of the press unless some means are provided to compress or hold the top layers of cotton below the bale-forming means or head of the press it will be impossible to successfully move the bale from its forming position to the finishing side of the press, as the elasticity of the compressed layers of cotton will at once cause the bale to spring forward as soon as the pressure is removed, and by virtue of the increase in size the bale cannot thereafter be placed beneath the head of the press on the finishing side.

It is the object of my present invention to provide means whereby after the layers of cotton have been assembled in the forming bale-box under any suitable compression desired that the layers of cotton thus assembled may be held under the forming compression while the bale and the box in which it is contained are transferred from under the bale-forming mechanism to the finishing side of the press, and it is also an object of my present invention to provide means connected with the bale-forming mechanism to indicate continuously the amount of compression given to the cotton as the bale is being formed.

In the present embodiment of my invention I have shown a form of "duplex or double-box press"—that is, one in which a circular platform or carrier supports two or more bale-boxes and which may be rotated at intervals to transfer the bale-boxes beneath the bale-forming mechanism or to the finishing side of the press; but it is to be understood, of course, that the invention hereinafter described is not limited in this respect, as it may be applied to any of the various forms of baling-machines wherein it is desired to hold the cotton or other like material under a certain amount of compression while the baled cotton or other like material is transferred from under the bale-forming mechanism, and it is equally obvious that the particular character of bale-forming mechanism herein shown and described might be replaced by any of the usual or desired forms of such mechanism, it being only necessary that as the layers of cotton are placed within the bale-box they be subjected to compression and held under such compression during the formation of the bale.

In the drawings, Figure 1 is a side elevation of a baling-machine embodying the features of my invention. Fig. 2 is an elevation at right angles to that shown in Fig. 1. Fig. 3 is a detail of a modified form of bale-holding dog, and Fig. 4 is a detailed detached view of the under side of the finishing-head.

Mounted upon a suitable upright shaft B, sustained by appropriate framework A, is the bale-carrying platform B', upon which a plurality of bale-boxes C may be mounted, said bale-boxes being of any usual or preferred form of construction, (not necessary herein to specifically describe, except in so far as they are modified in accordance with the structural features of my invention.)

Mounted below the bale-carrying platform in suitable position to exert operative compression upon the bale are the two cylinders C' C², in which work the pistons C³ C⁴, these parts being located so that while the bale is being formed one of said pistons may hold under compression the layers of cotton as they are laid upon each other, while the other piston C³ may be operated to give the finishing compression to the bale, all as usual in the particular type of baling-machine herein selected for the illustration of my invention.

Suitably secured and mounted above the bale-carrying platform B' is the bale-forming mechanism D, comprising a traveling hopper H, mounted to travel back and forth on the guides H' by any suitable mechanism, (not necessary to herein illustrate, as it forms no part of my present invention.) The bale-forming mechanism further comprises a series of rolls $h$, around which pass the endless belts $h'$, said belts being held stationary as regards their travel with respect to the bale-box by means of any suitable devices, as the rods $h^2$, the material being fed between the contiguous ends of the two series of rolls $h\ h$, as represented in Fig. 1, and led into the bale-box by the travel of the bale-forming mechanism over the top thereof, all as will be well understood by one skilled in the art. The rolls $h$ are journaled so as to have free rotation in the side bars $h^3$ of the bale-forming mechanism, and the end roll of the series on each side of the outlet of the hopper H has preferably a yielding bearing $h^4$, a spring $h^5$ normally tending to hold the bearing $h^4$ in its lowest position, as shown in Fig. 1. Immediately above the spring $h^5$ is arranged an indicator $h^6$ of any usual or preferred construction, the said indicator being acted upon by the spring $h^5$ to register the amount of push or compression against the end roll $h^2$ of the series by means of a stem and bearing $h^7$. It will be noted that as the bale-forming mechanism D is traversed back and forth over the top of the bale-box C the cotton or other material will be subjected to compression by the piston C⁴, acting in the cylinder C², and the amount of compression thus exerted upon the layers of cotton as they are delivered into the bale-box C will be accurately designated on the indicator $h^6$ through the intervening devices hereinbefore referred to.

It will be understood, of course, that while I have shown the particular construction of indicator $h^6$ as connected to the bale-forming mechanism D through the movable journal $h^4$ of one of the rolls $h$ it is to be understood that the details of this construction may be varied within wide limits without departing from this feature of my invention, it being only necessary that the rolls of the bale-forming mechanism, or one of them, shall indicate to the attendant the compression to which the fiber or other material is being subjected throughout the entire period of the formation of the bale, so that in case of excess in pressure or undue decrease thereof the requisite manipulation may be made of the compression devices to cause the compression of the bale to be uniform throughout the process of its formation.

After the formation of the bale and while the same is in the compressed condition due to the continuous action of the compression devices during the formation of the bale it becomes necessary to transfer the finished bale from beneath the bale-forming mechanism D, and I have provided devices which may be thrown into action at any desired time to hold the layers of cotton in their compressed condition while the bale is being transferred from beneath the bale-forming mechanism, and such devices I will now proceed to describe.

Preferably mounted on each side of the bale-box, near the upper portion thereof, is a bracket or support $a$, in which is loosely mounted for rotation the parallel shafts $a'$, extending preferably the full width of the bale-box. Each of the shafts $a'$ is provided with a series of ratchet-teeth $a^2$, which are adapted to be engaged by a pawl $a^3$, normally held in contact with the ratchet-teeth $a^2$ by a spring $a^4$. Disposed along the length of the shafts $a'$ and secured thereto are a series of bale-holding dogs $b$, the number of said holding-dogs being varied as desired and preferably formed to pass through suitable slots $b'$, formed in the upper portion of the bale-box, so as to bear upon the cotton or other like material contained within the bale-box when the said dogs are turned into the position shown in Fig. 1 by full lines. The particular form of these bale-holding dogs is not material; but they are preferably formed so as to be capable of being moved with the shafts $a'$, so as to pass through the slots $b'$ in the bale-box and bear upon the material therein or be moved from engagement with said slots with the ends of the dogs in the dotted-line position as shown to the left of Fig. 1.

It will be evident that when the bale-box has become filled with the compressed fiber or like material or if the shafts $a'$ are turned to carry the ends of the bale-holding dogs $b$ into the bale-box the ends of said dogs will bear upon the cotton forming the top layer of the bale and that the pawls $a^3$, by engagement with the ratchet-teeth $a^2$ on the shafts $a'$, will maintain the dogs in their position of engagement with the top of the bale and prevent expansion of said bale even after the bale and bale-box have been removed from under the bale-forming mechanism. It is desirable, however, in some instances to force the bale-holding dogs $b$ downward upon the top of the bale in order that the top layers of cotton forming the bale may be depressed below the bale-forming mechanism, so that as the bale-box is removed from under the bale-forming mechanism the top layers of cotton will not become disturbed or injured by scraping along the surface of the bale-forming mechanism, and I have therefore provided means for forcing the bale-holding dogs downward upon the top of the bale, such means in the present embodiment of my invention consisting of a cylinder $d$, one or more for each bale-box, mounted upon the bale-carrying platform $B'$ by the side of the bale-box. The piston-rod $d'$, carrying a usual piston, (not necessary to illustrate,) works within the cylinder $d$ and is connected to the operating-arms $d^2$, which are secured to the shafts $a'$, from which it will be obvious that upon the application of steam, compressed air, or other like fluid to the cylinder $d$ the piston-rod $d'$ will operate through the operating-arms $d^2$ to turn the shafts $a'$ and force the dogs upon the top of the bale.

In order that the operating-arms $d^2$ for each of the shafts $a'$ $a'$ may be simultaneously moved by the piston-rod $d'$, I have preferably provided each of the operating-arms $d^2$ with a slot $d^3$, with which the piston-rod $d'$ engages by means of a pin $d^4$, the construction being such that the operating-arms $d^2$ may be connected to the pin $d^4$ and together be drawn downward by the piston-rod $d'$ to force the dogs upon the top of the cotton.

It will be understood, of course, that the dogs $b$ are forced to their position upon the top of the cotton in the bale-box while the bale is under compression—in other words, while the bale-forming mechanism D, of whatever construction, is bearing upon the top of the cotton in the bale—and to enable this to be done I have as one of the expedients of my invention formed the belts $k$ of the bale-forming mechanism of separate widths, (more clearly shown in Fig. 2,) and I likewise form the rolls $h$ of a width corresponding to the sections of the belt $k$, thereby providing spaces $k'$ between the belts and rollers, through which the dogs $b$ may pass as they are turned by the shafts $a'$ to enter upon the top of the bale. It will be evident, of course, that this particular means or disposition of parts to permit the entrance of the bale-holding dogs $b$ onto the top of the cotton below the bale-forming mechanism D may be varied within wide limits, depending upon the particular character of bale-forming mechanism used, it being only necessary that provision be made for the passage of the dogs from the position shown in dotted lines in the left of Fig. 1 to the position bearing upon the top of the bale.

In the preferred embodiment of my invention I have shown the dogs $b$ as formed of a single piece, and in practice I find such construction to work well; but where such form of dogs is used it has generally been necessary to provide some means for the raising of said dogs from their operative position on the top of the bale to their inoperative position outside of the bale-box when the bale has been transferred beneath the finishing-head M, as it is obvious that should the dogs be in direct contact with the finishing-head when the bale is on the finishing side of the press it would be impossible to turn the dogs downwardly to permit the finishing compression of the bale against the finishing-head. As one of the means for permitting the movement of the dogs from their operative to their inoperative position while the bale is under the finishing-head M, I dispose the finishing-head M slightly higher than the lower surface of the bale-forming mechanism D, as shown in Fig. 2, so that sufficient room may be afforded for the turning of the dogs as desired. As another means for accomplishing the same—that is, permitting the dogs to be turned from their operative to their inoperative position while the bale is under the finishing-head—I may provide in the finishing-head M passages $m$ sufficiently deep for the passage of the dogs as they are turned from their position on top of the bale to their position outside the bale-box, and where such slots or passages $m$ are formed the finishing-head may of course be on the same level with the bottom of the bale-forming mechanism D. I may here remark also that various mechanical devices and disposition of parts might be employed for this purpose, and I do not regard my invention as limited in this respect, as it is only necessary that provision be made for the turning of the dogs from their operative to their inoperative position under the finishing-head in order to enable the finishing compression to be given to the bale.

In Fig. 3 I have shown a detail of a modified form of bale-holding dog which consists of a dog formed in two parts $f f'$, pivoted together by a knife-joint at $f^2$, a spring $f^3$ normally tending to hold the two parts $f f'$ of the dog in the position shown in Fig. 3. With this form of dog it will be obvious that the dogs may be turned from their operative to their inoperative position while the bale is under the finishing-head of the press without modifying the disposition of the usual parts of a press or providing special passages or other means for the dogs, since on turning the dogs upward while the bale is under the finishing-head the pivoted point $f'$ of the dogs will engage the under side of the head and be turned on their pivot $f^2$ and simply withdrawn through the slots of the bale-box from their position upon the top of the bale.

While I have shown the cylinder $d$ and piston-rod $d'$ and the operating-arms $d^2$ for operating shafts $a'$ to throw the dogs into their operative and inoperative position, it is to be understood, of course, that I may use any form of devices suitable for giving this forcible rotative movement to the shafts $a'$. In fact, these shafts could under some conditions be moved, as stated, by hand by simply disconnecting the piston-rod $d'$ from the operating-arms $d^2$, and I would regard as within the scope of my invention any means for giving the necessary movement to the dogs as herein generally outlined.

When the dogs have been forcibly pressed upon the top of the bale, it will be understood, of course, that the pawls $a^3$ engage the ratchet-teeth $a^2$ and hold the dogs in their operative position, and when turning the dogs to throw them into their inoperative position it is only necessary to disengage the pawls $a^3$ from their ratchet-teeth $a^2$. While the bale-forming mechanism herein shown as the embodiment of my present invention employs a traveling carriage and series of rolls with their coöperating belts, it is to be understood, of course, that this construction may be varied within wide limits and the number of rolls, characters of belts, &c., changed without departing from the spirit of my invention.

Having thus described my invention, what I claim, and desire to secure by Letters Patent, is—

1. In a baling-machine, the combination of bale-forming mechanism, a bale-box adapted to be placed below said mechanism, and means journaled upon the bale-box and movable into position between the bale-forming mechanism and top of the bale after the formation of the latter to press the top layers of the bale away from the bale-forming mechanism and hold the material of the bale in position as the bale is moved from the bale-forming mechanism.

2. In a baling-machine, the combination of bale-forming mechanism, a bale-box for receiving material delivered thereinto from the bale-forming mechanism, devices journaled upon the bale-box and movable onto the top of the bale after the formation of the latter, and means for turning and simultaneously compressing said devices upon the top of the bale to compress the layers of material below the bale-forming mechanism and retain them in such position as the bale is removed from the bale-forming mechanism.

3. In a baling-machine, the combination of bale-forming mechanism, a bale-box for receiving material to be baled, bale-holding dogs journaled upon the bale-box and movable onto the top of the bale after the formation of the latter and prior to its removal from the bale-forming mechanism, and means for forcing the dogs upon the top of the bale to carry the layers of material away from the bale-forming mechanism and holding them in such position as the bale is removed from the bale-forming mechanism.

4. In a baling-machine, the combination of bale-forming mechanism, a bale-box for receiving material to be baled, a shaft mounted on said bale-box, bale-holding dogs secured to said shaft, and means for turning said shaft to carry the dogs onto the top of the bale after the formation of the latter.

5. In a baling-machine, the combination of bale-forming mechanism, a bale-box for receiving material to be baled and having slots therein, a shaft mounted on said bale-box and carrying bale-holding dogs, means for turning said shaft to carry the dogs onto the top of the bale and devices for holding the dogs in position on top of the bale as the bale is removed from the bale-forming mechanism.

6. In a baling-machine, the combination of bale-forming mechanism, a bale-box for receiving the material to be baled, means for maintaining pressure on the material as it is being baled and devices operated by the pressure of said means upon the material being baled for indicating the pressure on the material throughout the baling operation.

7. In a baling-machine, bale-forming mechanism comprising rollers and belts, a bale-box for receiving the material to be baled, means for maintaining pressure on the material during the baling operation, one of the rollers of the bale-forming mechanism being yielding and means connected with said yielding roller to indicate the pressure exerted on the material throughout the baling operation.

8. In a baling-machine, a pivoted bale-holding dog, said dog comprising a plurality of parts between the pivot and end thereof, said parts being flexibly united.

9. In a baling-machine, the combination of a bale-box, means for forming material into a bale, and bale-holding dogs pivotally connected to said bale-box and formed of a plurality of flexibly-united parts, said dogs movable into position upon the top of the bale after the formation of the latter for holding the layers of material in position as the bale is transferred from the bale-forming mechanism.

ABNER D. THOMAS.

In presence of—
 L. S. SMOTHERS,
 J. A. WATKINS.